United States Patent
Douskey et al.

(10) Patent No.: US 8,365,006 B2
(45) Date of Patent: Jan. 29, 2013

(54) PREVENTING CIRCUMVENTION OF FUNCTION DISABLEMENT IN AN INFORMATION HANDLING SYSTEM

(75) Inventors: Steven M. Douskey, Rochester, MN (US); Thomas Pflueger, Leinfelden (DE); Edward M. Seymour, Round Rock, TX (US); Timothy M. Skergan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 12/836,103

(22) Filed: Jul. 14, 2010

(65) Prior Publication Data

US 2012/0017109 A1    Jan. 19, 2012

(51) Int. Cl.
*G06F 1/10* (2006.01)
(52) U.S. Cl. ........................................ 713/601; 713/322
(58) Field of Classification Search ................. 713/300, 713/322–324, 601
See application file for complete search history.

(56) References Cited

U.S. PATENT DOCUMENTS

| | | | |
|---|---|---|---|
| 5,392,437 A * | 2/1995 | Matter et al. ................. | 713/324 |
| 6,301,665 B1 | 10/2001 | Simonich et al. | |
| 7,284,143 B2 * | 10/2007 | Song et al. ................... | 713/503 |
| 7,711,972 B2 * | 5/2010 | He et al. ........................ | 713/340 |
| 2003/0028786 A1 | 2/2003 | Mustafa | |
| 2003/0159056 A1 | 8/2003 | Cromer et al. | |
| 2006/0129856 A1* | 6/2006 | Main et al. .................... | 713/320 |
| 2006/0174338 A1 | 8/2006 | Winneg et al. | |
| 2007/0240062 A1 | 10/2007 | Christena et al. | |
| 2010/0011209 A1 | 1/2010 | Kiriansky et al. | |

\* cited by examiner

*Primary Examiner* — Glenn A Auve
(74) *Attorney, Agent, or Firm* — James L. Baudino; Matthew B. Talpis

(57) ABSTRACT

For disabling a first function in an information handling system, a dynamic signal is disabled. The first function is inoperable in response to the dynamic signal being disabled. At least a second function in the information handling system is operable irrespective of whether the dynamic signal is disabled.

24 Claims, 3 Drawing Sheets

PREVENTING CIRCUMVENTION OF FUNCTION DISABLEMENT IN AN INFORMATION HANDLING SYSTEM

BACKGROUND

The disclosures herein relate in general to information handling systems, and in particular to preventing circumvention of function disablement in an information handling system.

A manufacturer of an information handling system may wish to disable one or more of the system's functions, such as an accelerator unit or a cryptographic unit. For example, due to various concerns (e.g., legal, security and/or business concerns), the manufacturer may wish to prohibit a particular customer (or group of customers) from using the disabled functions. Nevertheless, if such disablement is controlled by a signal having a static logical state, then an unauthorized person may attempt to circumvent such disablement by physically overriding the signal.

BRIEF SUMMARY

For disabling a first function in an information handling system, a dynamic signal is disabled. The first function is inoperable in response to the dynamic signal being disabled. At least a second function in the information handling system is operable irrespective of whether the dynamic signal is disabled.

DETAILED DESCRIPTION

Figure 1:
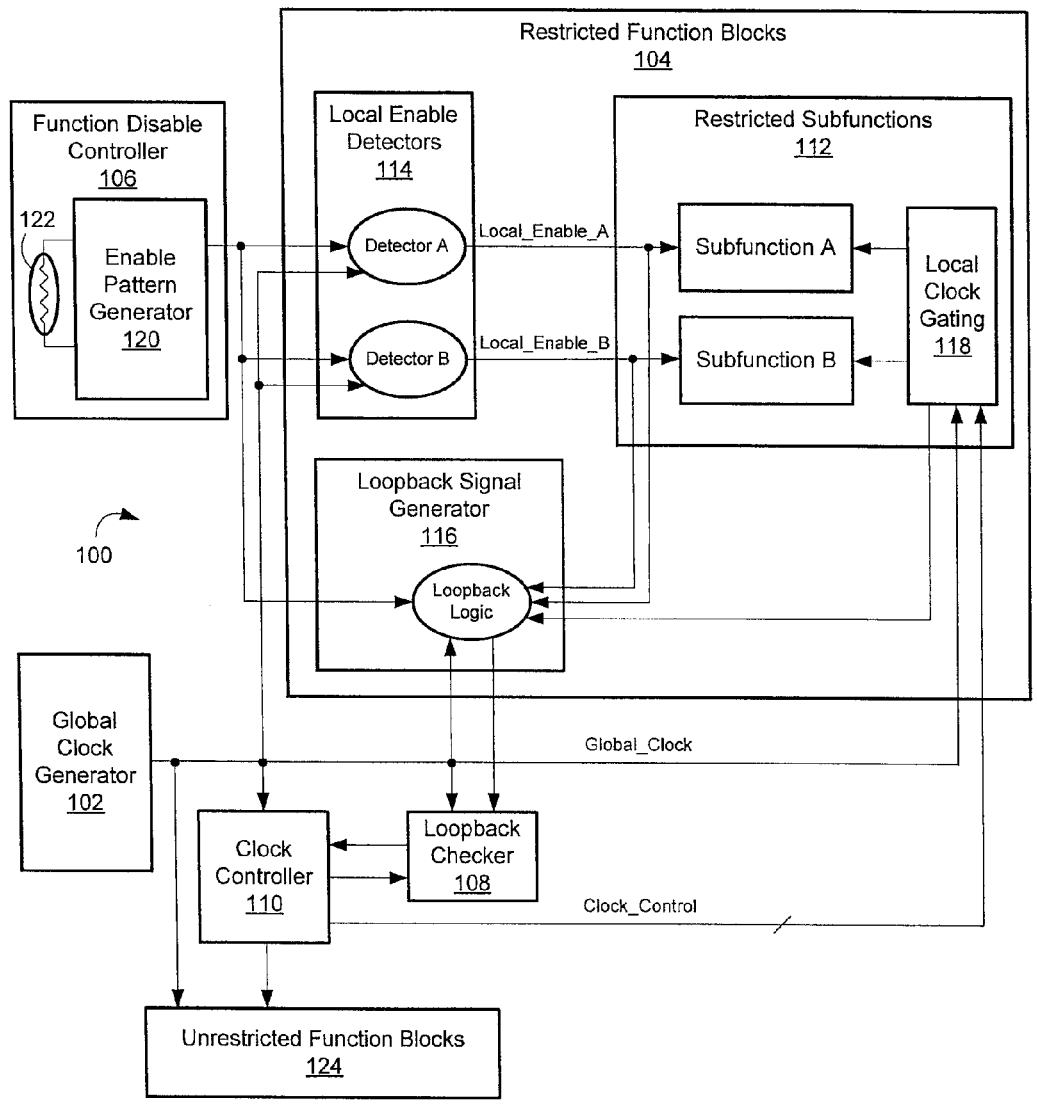
FIG. 1 is a block diagram of an information handling system of the illustrative embodiment.

FIG. 1 is a block diagram of an information handling system, indicated generally at 100, of the illustrative embodiment. As shown in FIG. 1, the system 100 includes a global clock generator 102, restricted function blocks 104 (also referred to as restricted functional units), a function disable controller 106, a loopback checker 108, and a clock controller 110. In the example of FIG. 1, the system 100 is part of a single integrated circuit microprocessor, which also includes various other units, registers, buffers, memories, and other sections, all of which are formed by integrated circuitry.

The global clock generator 102 generates and outputs a global clock signal on a global_clock line. The restricted function blocks 104 include restricted subfunctions 112 (also referred to as restricted subfunctional units), local enable detectors 114 (e.g., comparators), and a loopback signal generator 116. In the example of FIG. 1, the restricted subfunctions 112 include a subfunction A, a subfunction B, and local clock gating 118.

In one example, the subfunction A is an accelerator unit for accelerating various mathematical operations of the microprocessor, and the subfunction B is a cryptographic unit for encrypting/decrypting information for various operations of the microprocessor. The subfunction A operates in response to: (a) dynamic clock signals from the local clock gating 118; and (b) a static local enable A signal on a local_enable_A line from a detector A of the local enable detectors 114. Similarly, the subfunction B operates in response to: (a) dynamic clock signals from the local clock gating 118; and (b) a static local enable B signal on a local_enable_B line from a detector B of the local enable detectors 114. The local clock gating 118 generates and outputs the dynamic clock signals to the subfunction A and the subfunction B, and to the loopback signal generator 116, in response to: (a) the global clock signal on the global_clock line from the global clock generator 102; and (b) suitable clock control signals on multiple clock_control lines from the clock controller 110.

The detector A generates and outputs the static local enable A signal on the local_enable_A line in response to: (a) the global clock signal on the global_clock line from the global clock generator 102; and (b) a dynamic enable signal from an enable pattern generator 120 of the function disable controller 106. Similarly, the detector B generates and outputs the static local enable B signal on the local_enable_B line in response to: (a) the global clock signal on the global_clock line from the global clock generator 102; and (b) the dynamic enable signal from the enable pattern generator 120 of the function disable controller 106.

Figure 2:
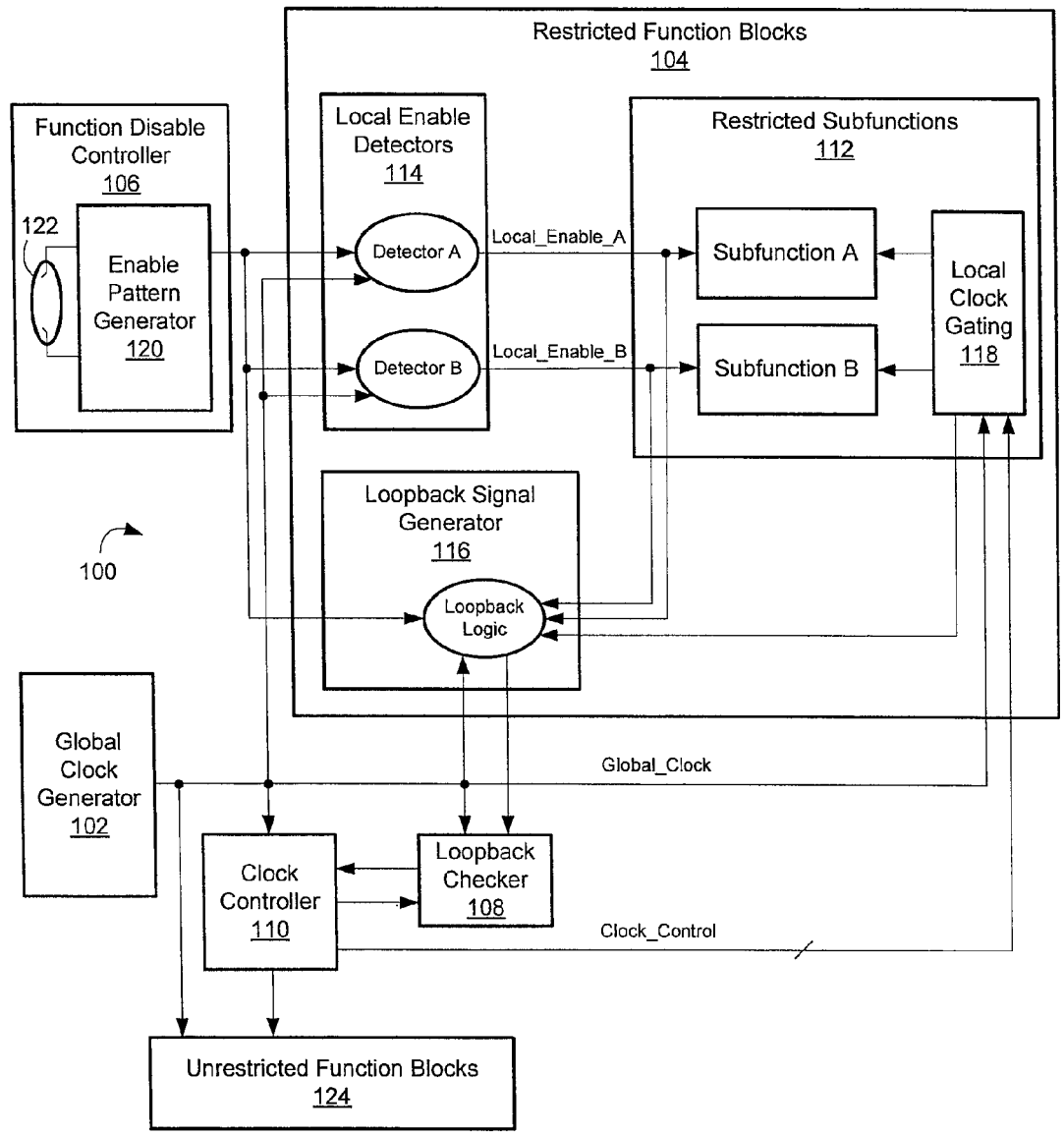
FIG. 2 is a block diagram of the system of FIG. 1 after function disablement.
Figure 3:
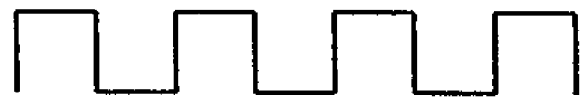
FIG. 3 is a timing diagram of an enable signal in the illustrative embodiment.
Figure 4:
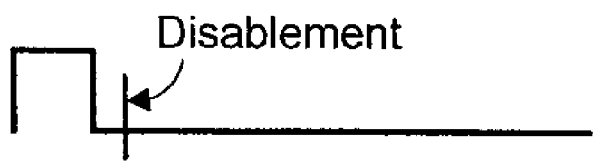
FIG. 4 is a timing diagram of a disable signal in the illustrative embodiment.

The enable pattern generator 120 generates and outputs: (a) the dynamic enable signal in response to a fuse 122 (having a predetermined resistance) being enabled by connection as a closed circuit between two nodes of the enable pattern generator 120, as shown in FIG. 1; and (b) a disable signal in response to the fuse 122 being disabled by disconnection as an open circuit between the two nodes of the enable pattern generator 120, as shown in FIG. 2. FIG. 3 is a timing diagram of the enable signal in the illustrative embodiment. FIG. 4 is a timing diagram of the disable signal in the illustrative embodiment, following such disablement of the fuse 122.

Figure 5:
FIG. 5 is a timing diagram of a loopback signal in the illustrative embodiment.

The loopback signal generator 116 includes loopback logic for receiving the global clock signal on the global_clock line, the local enable A signal on the local_enable_A line, the local enable B signal on the local_enable_B line, the enable signal (or the disable signal) from the enable pattern generator 120, and dynamic clock signals from the local clock gating 118. In response to such signals, the loopback logic generates and outputs a loopback signal to the loopback checker 108. The loopback signal indicates whether the restricted subfunctions 112 are properly enabled. FIG. 5 is a timing diagram of the loopback signal in the illustrative embodiment, in a case where the loopback signal indicates that the restricted subfunctions 112 are properly enabled.

In response to the loopback signal from the loopback signal generator 116, and in response to the global clock signal on the global_clock line, the loopback checker 108: (a) determines whether the restricted subfunctions 112 are properly enabled; (b) during a power on reset phase (in which the system 100 is designed to perform a scan initialization operation), generates and outputs a binary signal having a logical 0 "false" state if the restricted subfunctions 112 are properly enabled, or else a logical 1 "true" state if the restricted subfunctions 112 are disabled (e.g., not properly enabled); and (c) during a post-initialization phase (after successful completion of the power on reset phase), generates and outputs the binary signal having the logical 1 "true" state if the restricted subfunctions 112 are properly enabled, or else the logical 0 "false" state if the restricted subfunctions 112 are disabled. The clock controller 110 receives the binary signal from the loopback checker 108.

In response to the binary signal from the loopback checker 108 having the logical 0 "false" state (during the power on reset phase) or the logical 1 "true" state (during the post-initialization phase), the clock controller 110 generates and outputs the suitable clock control signals on the clock_control lines, in a manner that enables the local clock gating 118 to generate and output the dynamic clock signals to: (a) the subfunction A and the subfunction B (so that the subfunction A and the subfunction B properly operate); and (b) the loopback logic of the loopback signal generator 116 (so that the loopback signal indicates that the restricted subfunctions 112 are properly enabled). Conversely, in response to the binary signal from the loopback checker 108 having the logical 1 "true" state (during the power on reset phase) or the logical 0 "false" state (during the post-initialization phase), the clock controller 110 ceases to generate and output the suitable clock control signals on the clock_control lines, in a manner that effectively disables the local clock gating 118 from generating and outputting the dynamic clock signals to: (a) the subfunction A and the subfunction B (so that the subfunction A and the subfunction B are inoperable and cease to properly operate); and (b) the loopback logic of the loopback signal generator 116 (so that the loopback signal indicates that the restricted subfunctions 112 are disabled).

In response to the fuse 122 being disabled, the system 100 is inoperable to generate the dynamic enable signal, so that the system 100 effectively disables the dynamic enable signal. As shown in FIG. 2, if a manufacturer of the system 100 disables the fuse 122 by disconnection as an open circuit between the two nodes of the enable pattern generator 120, then the enable pattern generator 120 generates and outputs the disable signal. In response to the disable signal: (a) the system 100 disables the local enable A signal, so that such signal is absent on the local_enable_A line from the detector A; and (b) the system 100 disables the local enable B signal, so that such signal is absent on the local_enable_B line from the detector B. In response to such absence of the local enable A signal, the subfunction A is inoperable and ceases to properly operate. Similarly, in response to such absence of the local enable B signal, the subfunction B is inoperable and ceases to properly operate.

Moreover, in response to such absence of the local enable A signal and the local enable B signal, and in response to the disable signal from the enable pattern generator 120, the loopback logic (of the loopback signal generator 116) generates and outputs (to the loopback checker 108) the loopback signal for indicating that the restricted subfunctions 112 are disabled. In response to such loopback signal, the loopback checker 108 outputs (to the clock controller 110) the binary signal having the logical 1 "true" state (during the power on reset phase) or the logical 0 "false" state (during the post-initialization phase). In response to such binary signal, the clock controller 110 ceases to generate and output the suitable clock control signals on the clock_control lines, in a manner that effectively disables the local clock gating 118 from generating and outputting the dynamic clock signals to: (a) the subfunction A and the subfunction B (so that the subfunction A and the subfunction B are inoperable and cease to properly operate); and (b) the loopback logic of the loopback signal generator 116 (so that the loopback signal indicates that the restricted subfunctions 112 are disabled).

Accordingly, a person would encounter substantial difficulty in attempting to install a bypass connection as a closed circuit between the two nodes of the enable pattern generator 120, because: (a) the fuse 122 has a predetermined resistance, which is formed as part of the single integrated circuit by such circuit's semiconductor fabrication process; and (b) the bypass connection would have a resistance formed by a process after such fabrication. If the bypass connection fails to have the predetermined resistance, then the enable pattern generator 120 would likewise fail to generate and output the enable signal to the local enable detectors 114.

Further, as shown in the example of FIG. 3, the enable signal is a dynamic signal whose logical state changes frequently over time, instead of being a static signal whose logical state changes infrequently over time, so a person would encounter substantial difficulty in attempting to generate a suitable replacement for the enable signal. In one embodiment, the enable signal has a deterministic sequence that is more complex than the timing diagram of FIG. 3, such as a sequential count or a linear feedback shift register ("LFSR") count having a specified pattern. In one example, such deterministic sequence is a combination of multiple elementary sequences.

By having multiple detectors (e.g., the detector A and the detector B) and their respective local enable signals (e.g., the local enable A signal and the local enable B signal) for multiple restricted subfunctions (e.g., the subfunction A and the subfunction B), the system 100 increases a level of difficulty for a person to attempt circumvention of such disablement. Moreover, even if a person attempts to generate a suitable replacement for the local enable A signal and/or the local enable B signal, such attempt would be unproductive without the enable signal from the enable pattern generator 120, because the loopback logic (of the loopback signal generator 116) continues generating and outputting (to the loopback checker 108) the loopback signal for indicating that the restricted subfunctions 112 are disabled. Accordingly, the restricted subfunctions 112 are inoperable in response to the dynamic enable signal (from the enable pattern generator 120) being disabled, irrespective of whether the static local enable A signal and/or the static local enable B signal are disabled.

Also, even if a person attempts to set or clear the clock control signals (on the clock_control lines from the clock controller 110) to static logical states, such attempt would be counterproductive, because: (a) during the power on reset phase, the system 100 is designed to perform the scan initialization operation in response to first suitable clock control signals having first logical states; (b) during the post-initialization phase, the system 100 is designed to perform its remaining operations in response to second suitable clock control signals having second logical states; and (c) accordingly, if the clock control signals have static logical states, then the restricted subfunctions 112 operate inaccurately.

Further, even if a person attempts to set or clear the binary signal from the loopback checker 108 to a static logical state, such attempt would be counterproductive, because: (a) during the power on reset phase, the system 100 is designed to perform the scan initialization operation in response to the binary signal from the loopback checker 108 having the logical 0 "false" state; and (b) during the post-initialization phase, the system 100 is designed to perform its remaining operations in response to the binary signal from the loopback checker 108 having the logical 1 "true" state. Also, the clock controller 110 is operable to output a command for testing the loopback checker 108, so that: (a) the loopback checker 108 receives such command from the clock controller 110; and (b) in response to such command, the binary signal from the loopback checker 108 is set or cleared to a static logical state that is specified by such command. Accordingly, if a person attempts to set or clear the binary signal from the loopback checker 108 to a static logical state, then the clock controller 110: (a) detects such attempt; and (b) in response to such detection, ceases to generate and output the suitable clock control signals on the clock_control lines, in a manner that effectively disables the local clock gating 118 from generating and outputting the dynamic clock signals. In these various ways, the system 100 effectively prevents attempts to circumvent such disablement of the restricted subfunctions 112.

As shown in FIG. 1 and FIG. 2, the system 100 also includes unrestricted function blocks 124 (also referred to as unrestricted functional units), which: (a) receive the global clock signal on the global_clock line from the global clock generator 102; (b) receive suitable clock control signals from the clock controller 110; and (c) are operable irrespective of whether the dynamic enable signal (from the enable pattern generator 120) is disabled, irrespective of whether the static local enable A signal and/or the static local enable B signal (from the local enable detectors 114) are disabled, and irrespective of whether the dynamic clock signals (from the local clock gating 118) are disabled.

Although FIG. 1 and FIG. 2 show two detectors (detector A and detector B) for two restricted subfunctions (subfunction A and subfunction B), the system 100 is readily expandable to include additional detectors for additional restricted subfunctions.

Moreover, in an alternative embodiment, the enable pattern generator 120 generates and outputs: (a) either a first dynamic enable signal or a first disable signal to the detector A; and (b) either a second dynamic enable signal or a second disable signal to the detector B. In such alternative embodiment, the fuse 122 includes a first fuse and a second fuse, so that the enable pattern generator 120 generates and outputs: (a) the first dynamic enable signal in response to the first fuse (having a predetermined resistance) being enabled by connection as a closed circuit between a first two nodes of the enable pattern generator 120; (b) the first disable signal in response to the first fuse being disabled by disconnection as an open circuit between the first two nodes of the enable pattern generator 120; (c) the second dynamic enable signal in response to the second fuse (having a predetermined resistance) being enabled by connection as a closed circuit between a second two nodes of the enable pattern generator 120; and (d) the second disable signal in response to the second fuse being disabled by disconnection as an open circuit between the second two nodes of the enable pattern generator 120. Also, in such alternative embodiment, the loopback logic (of the loopback signal generator 116) generates and outputs (to the loopback checker 108): (a) a first loopback signal, which indicates whether the restricted subfunction A is properly enabled; and (b) a second loopback signal, which indicates whether the restricted subfunction B is properly enabled. Further, in such alternative embodiment, the loopback checker 108 generates and outputs (to the clock controller 110): (a) a first binary signal, which indicates whether the restricted subfunction A is properly enabled; and (b) a second binary signal, which indicates whether the restricted subfunction B is properly enabled. In response to such binary signals from the loopback checker 108, the clock controller 110 generates and outputs the suitable clock control signals on the clock control lines, in a manner that enables the local clock gating 118 to generate and output the dynamic clock signals to the subfunction A and/or the subfunction B independently of one another, so that the clock controller 110 is able to effectively disable the local clock gating 118 from generating and outputting the dynamic clock signals to the subfunction A and/or the subfunction B independently of one another.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including, but not limited to, firmware, resident software, or microcode) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be used in the illustrative embodiment. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium (including, but not limited to, wireless, wireline, optical fiber cable, RF, or any suitable combination of the foregoing).

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described with reference to flowchart illustrations and/or block diagrams of methods, apparatus (systems) and computer program products according to the illustrative embodiments. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions (which execute via the processor of the computer or other programmable data processing apparatus) are processable to cause performance of the functions/acts specified in the flowchart and/or block diagram block or blocks.

These computer program instructions may also be stored in a computer readable medium that can direct a computer, other programmable data processing apparatus, or other devices to operate in a particular manner, such that the instructions stored in the computer readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions that execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the illustrative embodiments. In this regard, each block in the flowchart or block diagrams may represent a module, segment, or portion of code, which includes one or more executable instructions for implementing the specified logical operation(s). In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified operations or acts, or combinations of special purpose hardware and computer instructions.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A method, comprising:
generating a dynamic clock signal in an information handling system in response to a global clock signal and a clock control signal, the dynamic clock signal operable to be received by a first function;
disabling the first function by disabling a dynamic enable signal, wherein the first function is inoperable in response to the dynamic enable signal being disabled, and wherein at least a second function in the information handling system is operable irrespective of whether the dynamic enable signal is disabled; and
in response to the dynamic enable signal being disabled, disabling the dynamic clock signal, wherein the first function is inoperable in response to the dynamic clock signal being disabled, and wherein at least the second function is operable irrespective of whether the dynamic clock signal is disabled.

2. The method of claim 1, and comprising:
in response to the dynamic enable signal being disabled, disabling a static signal, wherein the first function is inoperable in response to the static signal being disabled, and wherein at least the second function is operable irrespective of whether the static signal is disabled.

3. The method of claim 1, wherein the first function is operable to receive a static enable signal, and wherein the first function is inoperable in response to the dynamic enable signal being disabled, irrespective of whether the static enable signal is disabled.

4. The method of claim 1, wherein:
if the clock control signal has a static logical state, the first function operates inaccurately.

5. The method of claim 1, wherein disabling the dynamic enable signal comprises:
disabling a fuse, wherein the information handling system is inoperable to generate the dynamic enable signal in response to the fuse being disabled.

6. The method of claim 5, wherein disabling the fuse comprises:
disabling the fuse, wherein the fuse has a predetermined resistance.

7. A method, comprising:
in response to a fuse being disabled, disabling a first function in an information handling system by disabling a static signal and a dynamic clock signal, wherein the first function is inoperable in response to the static signal and the dynamic clock signal being disabled, and wherein at least a second function in the information handling system is operable irrespective of whether the static signal and the dynamic clock signal are disabled.

8. The method of claim 7, and comprising:
in response to the fuse being disabled, outputting a clock control signal, wherein the dynamic clock signal is disabled in response to the clock control signal.

9. The method of claim 8, wherein:
if the clock control signal has a static logical state, the first function operates inaccurately.

10. The method of claim 7, wherein the fuse has a predetermined resistance.

11. A system, comprising:
a first functional unit;
a second functional unit; and
disabling circuitry for:
- generating a dynamic clock signal in response to a global clock signal and a clock control signal, the dynamic clock signal operable to be received by the first functional unit;
- disabling the first functional unit by disabling a dynamic enable signal, wherein the first functional unit is inoperable in response to the dynamic enable signal being disabled, and wherein at least the second functional unit in the system is operable irrespective of whether the dynamic enable signal is disabled; and
- in response to the dynamic enable signal being disabled, disabling the dynamic clock signal, wherein the first functional unit is inoperable in response to the dynamic clock signal being disabled, and wherein at least the second functional unit is operable irrespective of whether the dynamic clock signal is disabled.

12. The system of claim 11, wherein the disabling circuitry is for:
in response to the dynamic enable signal being disabled, disabling a static signal, wherein the first functional unit is inoperable in response to the static signal being disabled, and wherein at least the second functional unit is operable irrespective of whether the static signal is disabled.

13. The system of claim 11, wherein the first functional unit is operable to receive a static enable signal, and wherein the first functional unit is inoperable in response to the dynamic enable signal being disabled, irrespective of whether the static enable signal is disabled.

14. The system of claim 11, wherein:
if the clock control signal has a static logical state, the first functional unit operates inaccurately.

15. The system of claim 11, wherein the disabling circuitry is for:
disabling the dynamic enable signal in response to a fuse being disabled, wherein the system is inoperable to generate the dynamic enable signal in response to the fuse being disabled.

16. The system of claim 15, wherein the fuse has a predetermined resistance.

17. A system, comprising:
a fuse;
a first functional unit;
a second functional unit; and
disabling circuitry for: in response to the fuse being disabled, disabling a static signal and a dynamic clock signal, wherein the first functional unit is inoperable in response to the static signal and the dynamic clock signal being disabled, and wherein at least the second functional unit in the system is operable irrespective of whether the static signal and the dynamic clock signal are disabled.

18. The system of claim 17, wherein the disabling circuitry is for:
in response to the fuse being disabled, outputting a clock control signal, wherein the dynamic clock signal is disabled in response to the clock control signal.

19. The system of claim 18, wherein:
if the clock control signal has a static logical state, the first functional unit operates inaccurately.

20. The system of claim 17, wherein the fuse has a predetermined resistance.

21. A method, comprising:
disabling a first function in an information handling system by disabling a dynamic signal, wherein disabling the dynamic signal comprises disabling a fuse, wherein the information handling system is inoperable to generate the dynamic signal in response to the fuse being disabled, wherein the first function is inoperable in response to the dynamic signal being disabled, and wherein at least a second function in the information handling system is operable irrespective of whether the dynamic signal is disabled; and
in response to the dynamic signal being disabled, disabling a dynamic clock signal, wherein the first function is inoperable in response to the dynamic clock signal being disabled, and wherein at least the second function is operable irrespective of whether the dynamic clock signal is disabled.

22. The method of claim 21, further comprising, in response to the dynamic signal being disabled, disabling a static enable signal, wherein the first function is inoperable in response to the static enable signal being disabled, and wherein at least the second function is operable irrespective of whether the static enable signal is disabled.

23. A system, comprising:
a first functional unit;
a second functional unit; and
disabling circuitry for:
- disabling the first functional unit by disabling a dynamic signal, wherein the dynamic signal is disabled in response to a fuse being disabled, wherein the system is inoperable to generate the dynamic signal in response to the fuse being disabled, and wherein the first functional unit is inoperable in response to the dynamic signal being disabled, and wherein at least the second functional unit in the system is operable irrespective of whether the dynamic signal is disabled; and
- in response to the dynamic signal being disabled, disabling a dynamic clock signal, wherein the first functional unit is inoperable in response to the dynamic clock signal being disabled, and wherein at least the second functional unit is operable irrespective of whether the dynamic clock signal is disabled.

24. The system of claim 23, the disabling circuitry for, in response to the dynamic signal being disabled, disabling a static signal, wherein the first functional unit is inoperable in response to the static signal being disabled, and wherein at least the second functional unit is operable irrespective of whether the static signal is disabled.

* * * * *